(12) United States Patent
Sutton et al.

(10) Patent No.: US 10,884,818 B2
(45) Date of Patent: *Jan. 5, 2021

(54) INCREASING PROCESSING CAPACITY OF VIRTUAL MACHINES

(71) Applicant: International Business Machines Corporation, Armonk, NY (US)

(72) Inventors: Peter G. Sutton, Lagrangeville, NY (US); David H. Surman, Milton, NY (US); Matthew D. Whitbourne, Whitbourne (GB)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 68 days.

This patent is subject to a terminal disclaimer.

(21) Appl. No.: 16/184,021

(22) Filed: Nov. 8, 2018

(65) Prior Publication Data

US 2020/0151021 A1 May 14, 2020

(51) Int. Cl.
*G06F 9/455* (2018.01)
*G06F 9/50* (2006.01)
*H04L 29/08* (2006.01)

(52) U.S. Cl.
CPC ........ *G06F 9/5077* (2013.01); *G06F 9/45558* (2013.01); *H04L 67/10* (2013.01); *G06F 2009/45579* (2013.01); *G06F 2209/5011* (2013.01)

(58) Field of Classification Search
None
See application file for complete search history.

(56) References Cited

U.S. PATENT DOCUMENTS

| 5,649,093 | A | 7/1997 | Hanko |
| 6,208,918 | B1 | 3/2001 | Ando et al. |
| 7,137,034 | B2 | 11/2006 | Largman |
| 7,433,945 | B2 * | 10/2008 | Ng .................. G06F 9/5016 709/213 |

(Continued)

FOREIGN PATENT DOCUMENTS

CN 103049309 B 9/2017

OTHER PUBLICATIONS

Al-Ghamdi, M., "Proactive Workload Forecasting Model with Dynamic Resource Allocation for Modern Internet Application," 2014 IEEE/ACM 7th International Conference on Utility and Cloud Computing, pp. 396-403, 2014 IEEE.

(Continued)

*Primary Examiner* — Gregory A Kessler
(74) *Attorney, Agent, or Firm* — Cantor Colburn LLP; William Kinnaman

(57) ABSTRACT

According to one or more embodiments of the present invention a computer-implemented method includes allocating, for a partition from a plurality of partitions of a computer server, a first set of computing resources of the computer server. The method further includes receiving a request to increase processing capacity for the partition. The method further includes in response, allocating a second set of computer resources, in addition to the first set of computer resources, for the partition. The method further includes operating the partition using the first set of computing resources and the second set of computing resources.

15 Claims, 7 Drawing Sheets

(56) References Cited

U.S. PATENT DOCUMENTS

| | | |
|---|---|---|
| 7,676,683 B2 | 3/2010 | Tsuji et al. |
| 7,721,292 B2 | 5/2010 | Frasier et al. |
| 7,861,117 B2 | 12/2010 | Coronado |
| 8,060,610 B1 | 11/2011 | Herington |
| 8,082,433 B1 | 12/2011 | Fallone |
| 8,171,276 B2 | 5/2012 | Fried |
| 8,219,653 B1 | 7/2012 | Keagy |
| 8,443,077 B1 | 5/2013 | Lappas |
| 8,464,250 B1 | 6/2013 | Ansel |
| 8,495,512 B1 | 7/2013 | Lappas |
| 8,627,133 B2 | 1/2014 | Tsirkin et al. |
| 8,898,246 B2 | 11/2014 | Gostin |
| 8,954,797 B2 | 2/2015 | Busaba |
| 9,130,831 B2 | 9/2015 | Cao |
| 9,146,608 B2 | 9/2015 | Bieswanger |
| 9,146,760 B2 | 9/2015 | Powell et al. |
| 9,164,784 B2 | 10/2015 | Otte et al. |
| 9,201,661 B2 | 12/2015 | Lin |
| 9,253,048 B2 | 2/2016 | Bhogal |
| 9,280,371 B2 | 3/2016 | Garza |
| 9,288,117 B1 | 3/2016 | Angrish |
| 9,563,777 B2 | 2/2017 | Deng |
| 9,626,210 B2 | 4/2017 | Phillips et al. |
| 9,742,866 B2 | 8/2017 | Shribman et al. |
| 9,836,363 B2 | 12/2017 | Nosov et al. |
| 9,891,953 B2 | 2/2018 | Beveridge |
| 10,185,670 B2 | 1/2019 | Litichever et al. |
| 2002/0188590 A1 | 12/2002 | Curran et al. |
| 2003/0009654 A1 | 1/2003 | Nalawadi et al. |
| 2005/0081210 A1 | 4/2005 | Day |
| 2008/0082983 A1 | 4/2008 | Groetzner |
| 2010/0107159 A1 | 4/2010 | Radhakrishman |
| 2010/0153763 A1 | 6/2010 | Sood |
| 2011/0239010 A1 | 9/2011 | Jain |
| 2012/0129524 A1 | 5/2012 | Swanson et al. |
| 2012/0311376 A1 | 12/2012 | Taranov et al. |
| 2013/0117168 A1 | 5/2013 | Sandstrom |
| 2013/0290958 A1 | 10/2013 | Ansel |
| 2014/0059542 A1 | 2/2014 | Ashok et al. |
| 2014/0380312 A1 | 12/2014 | Ansel |
| 2015/0052081 A1 | 2/2015 | Duron |
| 2015/0127776 A1 | 5/2015 | Cao et al. |
| 2015/0127975 A1 | 5/2015 | Patterson |
| 2015/0248341 A1 | 9/2015 | Cabrera |
| 2016/0077846 A1 | 3/2016 | Phillips et al. |
| 2016/0162376 A1 | 6/2016 | Errickson et al. |
| 2016/0291984 A1 | 10/2016 | Lu |
| 2016/0321455 A1 | 11/2016 | Deng et al. |
| 2017/0109204 A1 | 4/2017 | Feng et al. |
| 2017/0083371 A1 | 6/2017 | Beveridge et al. |
| 2017/0155560 A1* | 6/2017 | Lee .................. H04L 41/0896 |
| 2017/0178041 A1 | 6/2017 | Li |
| 2017/0228257 A1 | 8/2017 | Dong et al. |
| 2019/0324874 A1 | 10/2019 | Gill et al. |
| 2020/0151049 A1 | 5/2020 | Sutton |
| 2020/0153645 A1 | 5/2020 | Sutton et al. |

OTHER PUBLICATIONS

Disclosed Anonymously; "Method to manage resource affinity while scaling vertically in a cloud computing environment"; IP.com Prior Art Database Technical Disclosure IPCOM000234981D; Dated: Feb. 20, 2014; Retrieved: Sep. 11, 2018; 5 pages.

Disclosed Anonymously; "System and Method for Determining Resource Monitoring ThresholdsBase on Workload and Performance"; IP.com No. IPCOM000228218D; Dated: Jun. 13, 2013; Retrieved: Sep. 11, 2018; 3 pages.

International Business Machines Corporation, "SLA based autonomic optimzation of infrastructure," an IP.com Prior Art Database Technical Disclosure, original publication date Dec. 6, 2004, IP.com No. IPCOM000033318D, 4 pgs.

JoAnn M. Paul et al.; "Modeling and Simulation of Steady State and Transient Behaviors for Emergent SoCs"; Electrical and Computer Engineering Department, Carnegie Mellon University; Retrieved: Sep. 12, 2018; 6 pages.

List of IBM Patents or Patent Applications Treated as Related; (Appendix P), Date Filed Apr. 9, 2019; 2 pages.

Mell et al., "THE Nist Definition of Cloud Computing," Recommendations of the National Institute of Standards and Technology, U.S. Department of Commerce, Special Publication 800-145, Sep. 2011, 7 pgs.

Microsoft Corporation, "Prevent unexpected charges with Azure billing and cost management," Microsoft Docs, URL: https://docs.microsoft.com/en-us/azure/billing/billing-getting-started#ways-to-monitor-your-costs-when-using-azure-services. Published Jan. 24, 2018. Retrieved May 18, 2018. 12 pages.

Peter Sutton et al., "Increasing Processing Capacity of Processor Cores During Initial Program Load Processing", U.S. Appl. No. 16/184,017, filed Nov. 8, 2018.

Peter Sutton et al., "Increasing Processing Capacity of Processor Cores During Initial Program Load Processing", U.S. Appl. No. 16/184,023, filed Nov. 8, 2018.

Peter Sutton et al., "Increasing Processing Capacity of Virtual Machines for an Abnormal Event", U.S. Appl. No. 16/268,059, filed Feb. 5, 2019.

A. Regenscheid, "Platform Firmware Resiliency Guidelines," Google; 2017. 47 Pages.

Anonymous, "Recovering a Partition on a Server Outage Cluster Aware Virtual Input-Output Servers," IP.com; Jun. 2, 2016. 3 Pages.

Compton et al., "Increasing Resources for Partition to Compensate for Input/Output (I/O) Recovery Event," U.S. Appl. No. 16/376,013, filed Apr. 5, 2019.

IBM Corporation, "Z/OS Concepts," Google; 2010, 120 Pages.

List of IBM Patents or Patent Applications Treated as Related; (Appendix P), Filed Jun. 2, 2020, 2 pages.

* cited by examiner

INCREASING PROCESSING CAPACITY OF VIRTUAL MACHINES

BACKGROUND

The present invention relates to computing technology, and particularly a computer server system to dynamically increase the processing capacity of one or more virtual machines executing on corresponding partitions of the computer server system.

Organizations commonly use network data processing systems in manufacturing products, performing services, internal activities, and other suitable operations. Some organizations use network data processing systems in which the hardware and software are owned and maintained by the organization. These types of network data processing systems may take the form of local area networks, wide area networks, and other suitable forms. These types of networks place the burden of maintaining and managing the resources on the organization. In some cases, an organization may outsource the maintenance of a network data processing system.

Other organizations may use network data processing systems in which the hardware and software may be located and maintained by a third party. With this type of organization, the organization uses computer systems to access the network data processing system. With this type of architecture, the organization has less hardware to use and maintain.

This type of network data processing system also may be referred to as a cloud. In a cloud environment, the cloud is often accessed through the internet in which the organization uses computers or a simple network data processing system to access these resources. Further, with a cloud, the number of computing resources provided to an organization may change dynamically. For example, as an organization needs more computing resources, the organization may request those computing resources.

As a result, organizations that use clouds do not own the hardware and software. Further, these organizations avoid capital expenditures and costs for maintenance of the computing resources. The organizations pay for the computing resources used. The organizations may be paid based on the resources actually used, such as actual processing time and storage space, or other use of resources. The organizations also may pay for fixed amounts of computing resources periodically. For example, an organization may pay for a selected amount of storage and processing power on a monthly basis. This usage is similar to resources, such as electricity or gas.

SUMMARY

According to one or more embodiments of the present invention a computer-implemented method includes allocating, for a partition from a plurality of partitions of a computer server, a first set of computing resources of the computer server. The method further includes receiving a request to increase processing capacity for the partition. The method further includes in response, allocating a second set of computer resources, in addition to the first set of computer resources, for the partition. The method further includes operating the partition using the first set of computing resources and the second set of computing resources.

According to one or more embodiments of the present invention a system includes multiple computer servers, each computer server including multiple computing resources, multiple partitions, and a resource management module coupled with the partitions and the computing resources. The resource management module adjusts processing capacity of a partition of a computer server by performing a method that allocating, for a partition from a plurality of partitions of a computer server, a first set of computing resources of the computer server. The method further includes receiving a request to increase processing capacity for the partition. The method further includes in response, allocating a second set of computer resources, in addition to the first set of computer resources, for the partition. The method further includes operating the partition using the first set of computing resources and the second set of computing resources.

A computer program product including a computer readable storage medium having stored thereon program instructions executable by one or more processing devices to perform a method that allocating, for a partition from a plurality of partitions of a computer server, a first set of computing resources of the computer server. The method further includes receiving a request to increase processing capacity for the partition. The method further includes in response, allocating a second set of computer resources, in addition to the first set of computer resources, for the partition. The method further includes operating the partition using the first set of computing resources and the second set of computing resources.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
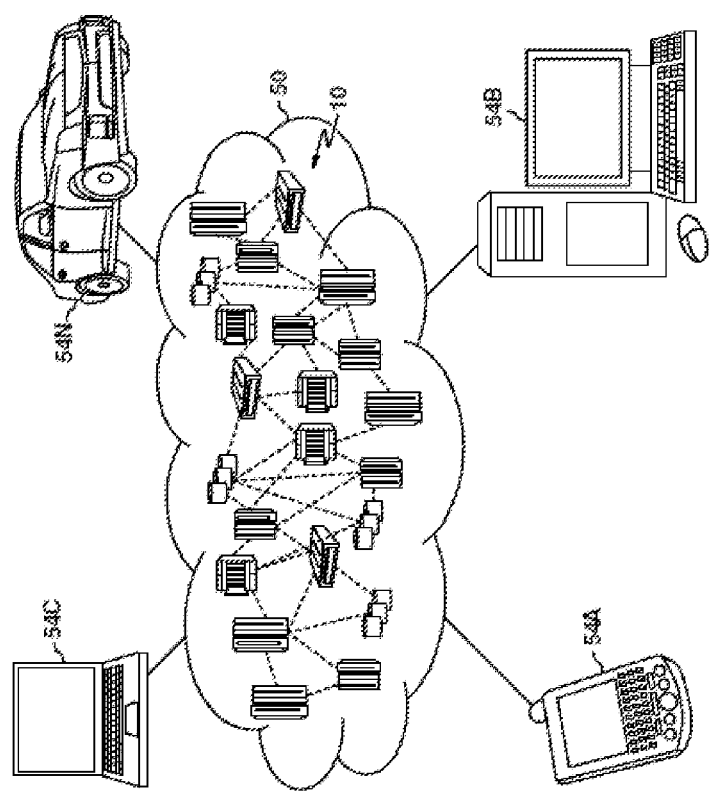
FIG. 1 depicts a cloud computing environment according to one or more embodiments of the present invention.

One or more embodiments of the present invention facilitate delivery of additional computing resources following detection of abnormal events that affect the ability of computing systems, such as a computer server system, to deliver expected levels of output. Typical computing systems are subject to degraded performance following a variety of abnormal (unplanned) events including hardware failures, software failures, etc. The degraded performance can also be caused due to collection of diagnostic information, and application of hardware and software service patches, updates following such abnormal events, and recovery from a system outage. Collecting the diagnostic information can include collection of dumps and traces. Recovering from the abnormal event, or outage can further take substantial time and resources, for example, because of a triggered initial program load (IPL), or booting of one or more partitions of the computing system. Additional time may be required because such operations (collecting diagnostic information/ recovery) can include workloads above typical expected system workload. Alternatively, or in addition, the performance of the computing system may degrade because of planned events such as initial program loading (booting), or scheduled update/patch etc.

Additional computing resources can be added to the computing system to mitigate the duration of degraded performance and to allow a performance increase following an outage, or during the scheduled operations that include additional workload.

It is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
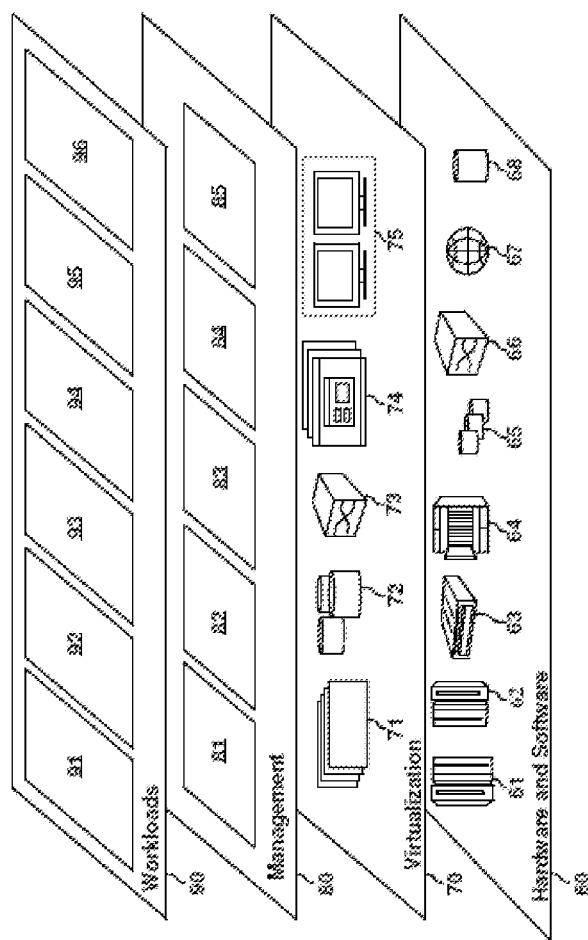
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and social networking and e-commerce 96, and the like.

Figure 3:
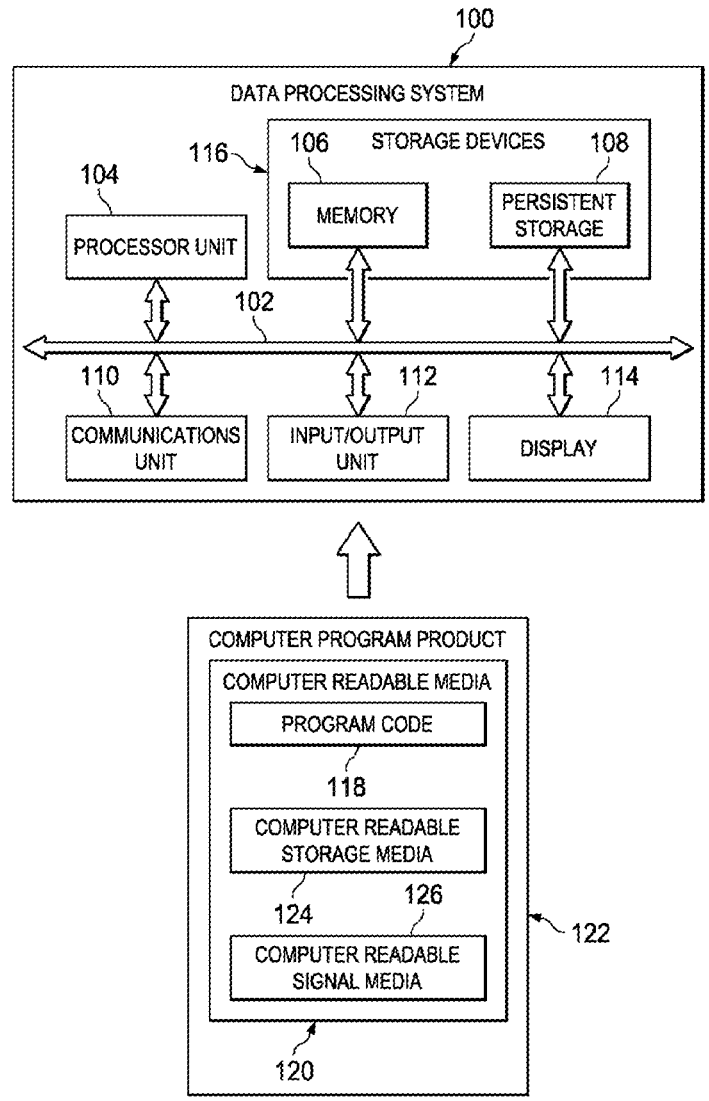
FIG. 3 depicts a block diagram of a data processing system according to one or more embodiments of the present invention.

FIG. 3 depicts a block diagram of a data processing system according to one or more embodiments of the present invention. The data processing system can be used as a computing node 10 in FIG. 1 and FIG. 2 herein. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a number of processors, a multi-processor core, or some other type of processor, depending on the particular implementation. A number, as used herein with reference to an item, means one or more items. Further, processor unit 104 may be implemented using a number of heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices 116. A storage device is any piece of hardware that is capable of storing information, such as, for example without limitation, data, program code in functional form, and/or other suitable information either on a temporary basis and/or a permanent basis. Memory 106, in these examples, may be, for example, a random access memory or any other suitable volatile or non-volatile storage device. Persistent storage 108 may take various forms depending on the particular implementation.

For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard, a mouse, and/or some other suitable input device. Further, input/output unit 112 may send output to a printer. Display 114 provides a mechanism to display information to a user.

Instructions for the operating system, applications and/or programs may be located in storage devices 116, which are in communication with processor unit 104 through communications fabric 102. In these illustrative examples, the instructions are in a functional form on persistent storage 108. These instructions may be loaded into memory 106 for execution by processor unit 104. The processes of the different embodiments may be performed by processor unit 104 using computer implemented instructions, which may be located in a memory, such as memory 106.

These instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 118 is located in a functional form on computer readable media 120 that is selectively removable and may be loaded onto or transferred to data processing system 100 for execution by processor unit 104. Program code 118 and computer readable media 120 form computer program product 122 in these examples. In one example, computer readable media 120 may be computer readable storage media 124 or computer readable signal media 126. Computer readable storage media 124 may include, for example, an optical or magnetic disk that is inserted or placed into a drive or other device that is part of persistent storage 108 for transfer onto a storage device, such as a hard drive, that is part of persistent storage 108. Computer readable storage media 124 also may take the form of a persistent storage, such as a hard drive, a thumb drive, or a flash memory, that is connected to data processing system 100. In some instances, computer readable storage media 124 may not be removable from data processing system 100. In these illustrative examples, computer readable storage media 124 is a non-transitory computer readable storage medium.

Alternatively, program code 118 may be transferred to data processing system 100 using computer readable signal media 126. Computer readable signal media 126 may be, for example, a propagated data signal containing program code 118. For example, computer readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 118 may be downloaded over a network to persistent storage 108 from another device or data processing system through computer readable signal media 126 for use within data processing system 100. For instance, program code stored in a computer readable storage medium in a server data processing system may be downloaded over a network from the server to data processing system 100. The data processing system providing program code 118 may be a server computer, a client computer, or some other device capable of storing and transmitting program code 118.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown.

Figure 4:
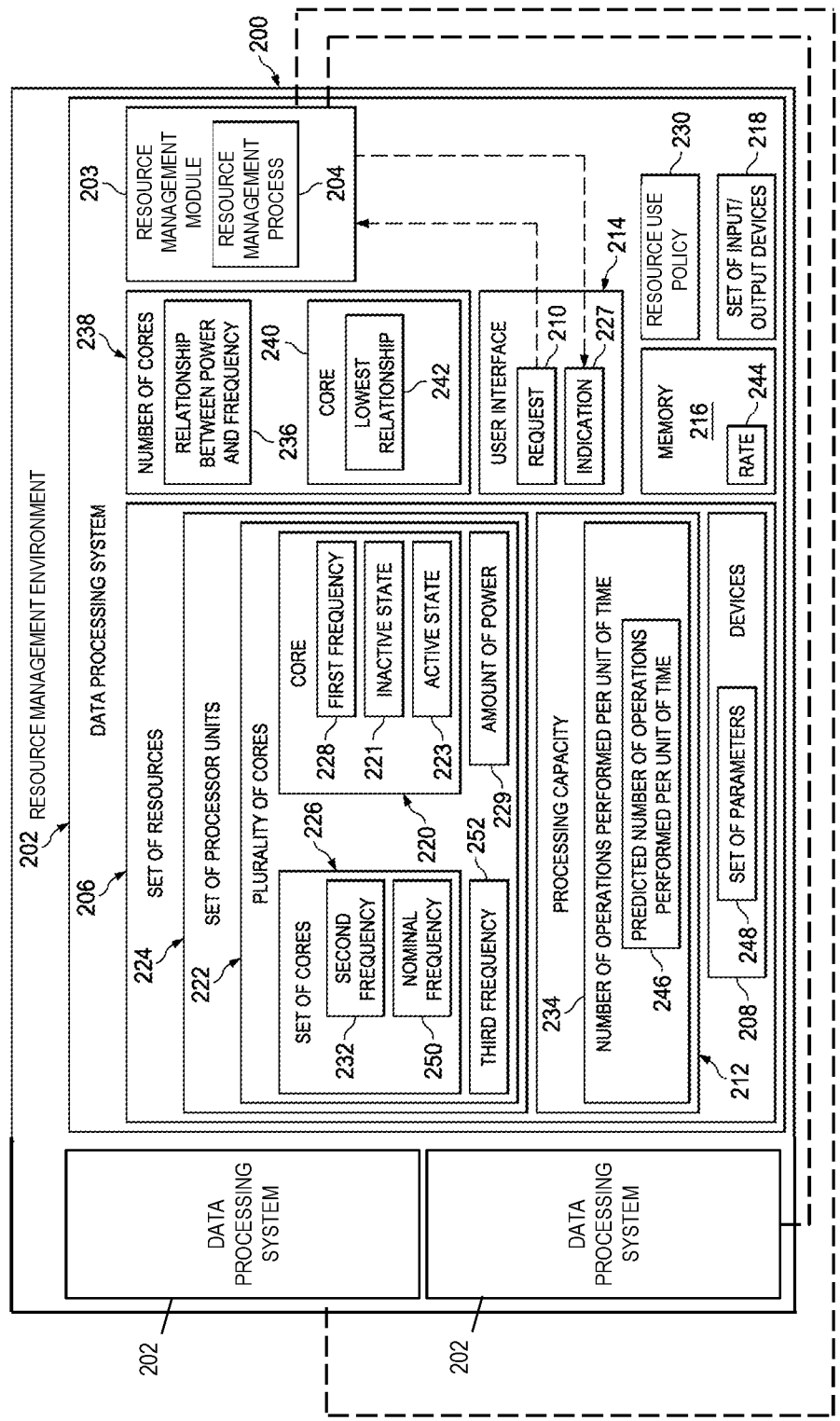
FIG. 4 depicts a block diagram of a resource management environment according to one or more embodiments of the present invention.

With reference now to FIG. 4, an illustration of a block diagram of a resource management environment is depicted according to one or more embodiments of the present invention. Resource management environment 200 is an environment in which illustrative embodiments may be implemented. In an illustrative embodiment resource management environment 200 is implemented in a server cluster that includes multiple data processing systems 202. The data processing systems 202 may be an example of one implementation of data processing system 100 in FIG. 3.

In the illustration, details are shown only for one of the data processing system blocks, however it is understood that other data processing systems 202 include similar architecture. Further, it should be noted that although only three data processing system blocks 202 are shown in FIG. 3, in other examples, the resource management environment 200 can include any other number of data processing systems.

Each of the data processing systems 202 includes resource management module 203 and set of resources 206. The resource management module 203 manages the use of the one or more resources 206. Further, the resource management module 203 can communicate with corresponding resource management modules of the other data processing systems 202 in the resource management environment 200 (server cluster) to provide/receive additional computing resources 206 to/from the other data processing systems 202.

Here, the resources 206 refer to one or more computing resources in the data processing system 202. For example, the set of resources 206 includes devices 208. Devices 208 may include any number of different devices that may include devices such as for example without limitation, processor unit 104, memory 106, persistent storage 108, communications unit 110, input/output (I/O) unit 112, and display 114. The devices 208 may also include devices that are external to data processing system 202. For example without limitation, devices 208 may include devices connected to data processing system such as a camera or external storage device connected by a universal serial bus (USB) or other suitable connector.

In these illustrative embodiments, resource management process 204 receives request 210. The resource management process 204 may receive request 210 from a user via user interface 214. In these examples, request 210 is a request for an increase in capacity or performance in set of resources 206. For example, request 210 may be a request for capacity upgrade on demand (CUoD).

In one example, request 210 is a request to increase processing capacity 212 of set of resources 206. In another example, request 210 is a request for an increase in memory 216 for set of resources 206. In yet another illustrative example, request 210 may be a request for an increase in set of input/output devices 218 for set of resources 206.

When resource management process 204 receives request 210 to increase processing capacity 212 of set of resources 206, the resource management process 204 may decide whether to activate core 220 and approve request 210. In these examples, core 220 is a core in the plurality of cores 222 in the set of processors 224. For example, the set of cores 226 in plurality of cores 222 are active in set of processors 224. As used herein, "active" when referring to a core in a processor means that the core is presently available to operate and execute instructions and perform operations for the processor. Core 220 may be inactive within set of processors 224. As used herein, "inactive" when referring to a core in a processor means that the core is not presently available to execute instructions and perform operations for the processor. For example, core 220 has inactive state 221 and active state 223. Inactive state 221 of core 220 is when core 220 is not presently available to execute instructions. For example, core 220 may be in a sleep state while in inactive state 221 in set of processor units 224. Activating the core 220 in set of resources 206 may increase processing capacity 212 in set of resources 206.

The resource management process 204 may determine whether the use of resource(s) from activating core 220 meets one or more policy 230 in data processing system 202. For example, the one or more policies 230 can include an SLA, a power use policy that provides rules on the use of power in data processing system 202 etc. For example, only a certain amount of power may be available for use in data processing system 202. The one or more policies may also include rules regarding which users or client devices of the data processing system may use certain resources in data processing system 202 based on an SLA with the user.

If the resource management process 204 determines that the use of resources resulting from activating core 220 at first frequency 228 does meet one or more policies, the resource management process 204 will activate core 220 at first frequency 228. For example, the resource management process 204 activates core 220 by establishing first frequency 228 and scheduling instructions on core 220. On the other hand, if one or more policies is not being met, then the resource management process 204 can deny request 210 to increase processing capacity 212. The resource management process 204 may provide indication 227 that request 210 to increase processing capacity 212 is unavailable. For example, the resource management process 204 may provide indication 227 to a user via user interface 214.

In these examples, a minimum operating frequency is the lowest frequency that the core can operate at. The minimum frequency may be a physical property of the core, the result of its logical design, or due to other property of the system such as the size of the buses interconnecting the various components of the system. No matter what the cause of the limitation, there is a well-defined minimum operating frequency.

The resource management process 204 then increases the first frequency 228 of core 220. In these illustrative examples, the desired value for first frequency 228 is selected based on an amount of increase in processing capacity 212 for set of resources 206. In this example, core 220 and set of cores 226 operate at the same frequency. However, this same frequency may be lower than second frequency 232 of set of cores 226 before activation of core 220.

Although the above examples describe adjusting the resources in the form of processor frequency, in other examples different types of resources may be adjusted. For example, the request 210 may also be a request for an increase in memory 216 in set of resources 206. For example, a user may request additional memory in a capacity upgrade on demand. Alternatively, or in addition, the resource management process 204 may identify rate 244 that data is written to and read from memory 216. The resource management process 204 may adjust rate 244 by throttling. Throttling is a process of inserting rest periods in operations performed on memory 216. For example, for certain periods of time the memory 216 may be inactive. The inactivity of memory 216 reduces rate 244 that data is written to and read from memory 216. In one or more examples, specialty compute resources previously reserved for specific functions may also be made available to the user for a limited period of time.

Further, in one or more examples, the request 210 may also be a request for an increase in set of input/output devices 218 for set of resources 206. For example, a user may request additional input/output devices in a capacity upgrade on demand. Set of input/output devices 218 may include, for example without limitation, persistent storage and/or communications units such as persistent storage 108 and communications unit 110.

According to one or more embodiments of the present invention, the resource management process 204 may monitor set of resources 206 and manage request 210. The resource management process 204 monitors use of resources 206 in the data processing system 202 following the request 210 being granted. If the use of the resources 206 does not meet the SLA or any other policies, the resource management process 204 can adjust the set of parameters 248 of devices 208 in set of resources 206. For example, the resource management process 204 may adjust rate 244 for memory 216. The resource management process 204 may adjust second frequency 232 of set of cores 226 or the voltage supplied to set of cores 222. The adjustments to the frequency and the voltage may be referred to as scaling. The resource management process 204 may scale the frequency and the voltage to meet power use policy. The resource management process 204 may also deactivate cores in the set of cores 226, portions of memory 216, and/or devices in the set of input/output devices 218.

In one illustrative example, the resource management process 204 may identify the number of cores that should be in active state 223 in set of resources 206 to maintain processing capacity 212. The resource management process 204 monitors the second frequency 232 that set of cores 226 are operating. The resource management process 204 can then compare second frequency 232 with nominal frequency 250 for set of cores 226. The nominal frequency 250 is the expected frequency that set of cores 226 can operate at without changes (reductions/increments) in frequency.

According to one or more embodiments of the present invention, the set of resources 206 in data processing system 202 may be a partition within data processing system 202. For example, the set of resources 206 may be a physical partition with devices 208 located within a common housing. Memory 216 and set of input/output devices 218 may also be located within the common housing. In other illustrative embodiments, set of processors 224, memory 216, and set of input/output devices 218 may all be part of a pool of resources that are connected via one or more communications unit and located externally to one another. The resource management process 204 may allocate devices 208 to form set of resources 206. A set of resources 206 may be used by one or more users at the same time.

In another example, core 220 may not be part of set of resources 206. All cores within set of resources 206 may be operating when the resource management process 204 receives request 210 to increase processing capacity 212. The resource management process 204 may allocate core 220 to set or resources 206 from a different set of resources. In a similar manner, memory 216 and set of input/output devices 218 may also be allocated to set of resources 206.

In yet another example, request 210 may be a temporary request. The request 210 may be a request for increased capacity for only a period of time. After the period of time, the resource management process 204 may deactivate devices that were activated to grant request 210. In other examples, the request 210 can be based a service billing metric or another policy based criteria, other than using the amount of time as a metric.

Figure 5:
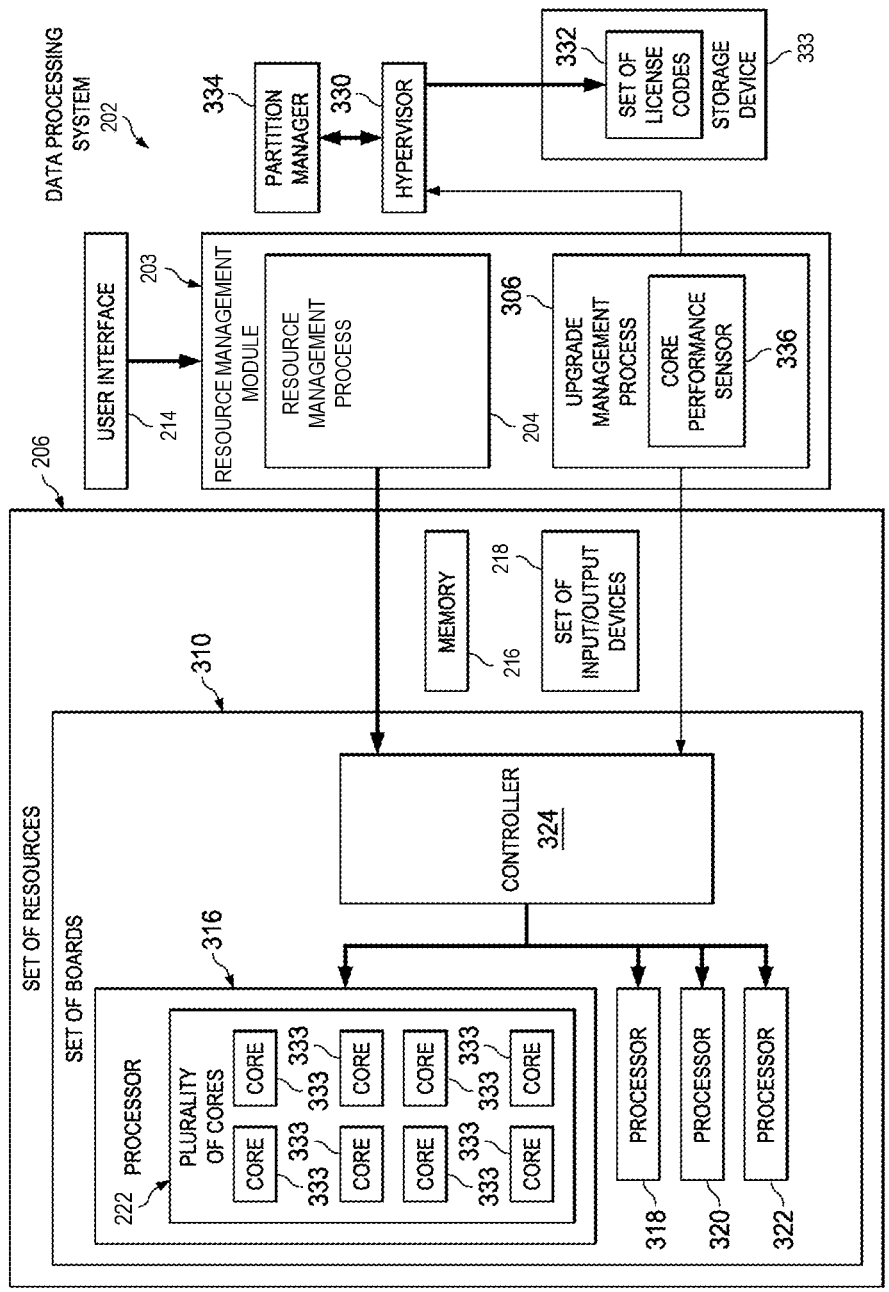
FIG. 5 depicts a block diagram of a resource management module in a data processing system according to one or more embodiments of the present invention.

FIG. 5 depicts a block diagram of a resource management module in a data processing system according to one or more embodiments of the present invention. The resource management module 203 includes the resource management process 204 and an upgrade management process 306. For example, the resource management process 204 may manage the use of the computing resources by devices in the data processing system 202. The upgrade management process 306 may manage a request for an increased capacity such as request 210 in FIG. 4, for example.

The data processing system 202 includes the set of resources 206. The set of resources 206 includes set of boards 310, memory 312, and set of input/output devices 314. The set of boards 310, memory 312, and set of input/output devices 314 are all resources in set of resources 206 in these examples. Set of boards 310 includes a number of processors. For example, set of boards 310 includes processor 316, processor 318, processor 320, and processor 322. In other examples, set of boards 310 can include any number of processors. In these examples, the set of boards 310 may be any surface for placement of and providing connections between components in a data processing system. For example, without limitation, the set of boards 310 may be a printed circuit board, a motherboard, a breadboard and/or other suitable surfaces.

In one or more examples, the set of boards 310 also includes a controller 324 that controls processors 316, 318, 320, and 322. For example, the controller 324 can activate processor 316 or one of the cores in plurality of cores 326 inside processor 316. The controller 324 can also control the frequency that each of the cores in plurality of cores 326 operate. The controller 324 can also control the voltage applied to the cores in plurality of cores 326. The controller 324 may include hardware devices such as, for example without limitation, a microcontroller, a processor, voltage and frequency sensors, an oscillator and/or any other suitable devices. In other examples, the controller 324 may include program code for controlling processors 316, 318, 320, and 322.

The resource management process 204 and upgrade management process 306 communicate with the controller 324 to manage resources in set of resources 206. For example, the resource management module 203 may receive a request to increase capacity in set of resources 206 via user interface 214. The request may be a request to increase processing capacity by activating cores in plurality of cores 326. Some cores in plurality of cores 326 may be in inactive state 221. Set of resources 206 may only be allowed to have a certain number of cores active. In other words, set of resources may only be licensed to use a certain number of cores in the multiple cores 326.

In one or more examples, the request may include a license code. The license code may include an identifier of a core and a key to activate the core. The resource management module 203 may receive the license code and communicate with a hypervisor 330 to determine which cores are licensed among the multiple cores 326.

The hypervisor 330 is a module which allows multiple operating systems to run on a data processing system 202. The hypervisor 330 may compare the license code from the request with a set of license codes 332 stored in a storage device. In these examples, each core among the multiple cores 326 has a license code in set of license codes 332. If the license code from the request matches a license code in set of license codes 332, the hypervisor 330 determines which core in plurality of cores 326 corresponds to the license code matched in set of license codes 332. The core determined is core 333 to be licensed in set of resources 206. The hypervisor 330 communicates core 333 to be licensed in set of resources 206 to the resource management module 203. On the other hand, if the license code in the request does not match a license code in set of license codes 332, the request is denied.

Additionally, if set of resources 206 is a partition within data processing system 202, the hypervisor 330 may communicate with a partition manager 334 to determine which resources are part of the partition. For example, the request to increase the processing capacity (increased computing resources) may be a request to increase a capacity in a particular partition. The hypervisor 330 may confirm that core 333 requested to be licensed among the multiple cores 326 is part of the partition. Partition manager 334 may maintain a listing of resources that are part of particular partitions. If core 333 requested to be licensed is not part of the partition requesting the capacity increase, partition manager 334 may allocate core 333 to the partition. Then hypervisor 330 can communicate the core to be licensed in set of resources 206 to resource management module 203.

In these illustrative examples, the resource management module 203 receives information identifying the core to be licensed in the cores 326. Upgrade management process 306 may then send instructions to controller 324 to activate the core to be licensed in plurality of cores 326. In one or more examples, the upgrade management process 306 includes core performance sensor 336. The core performance sensor 336 monitors performance of one or more cores from the cores 326. For example, core performance sensor 336 may monitor a frequency at which active cores among the multiple cores 326 operate. The upgrade management process 306 may activate core 333 at the same frequency the other active cores in plurality of cores 326, as previously discussed with regard to core 220 in FIG. 4. In other examples, the upgrade management process 306 may activate the core at a first frequency and adjust the frequency to increase the processing capacity of plurality of cores 326 in set of resources 206.

The illustration of resource management module 203 in data processing system 202 is not meant to imply physical or architectural limitations to the manner in which different features may be implemented. Other components in addition to and/or in place of the ones illustrated may be used. Also, the blocks are presented to illustrate some functional components. One or more of these blocks may be combined and/or divided into different blocks when implemented in different illustrative embodiments. For example, without limitation, in some illustrative embodiments the resource management module 203 may not be part of data processing system 202. The resource management module 203 may be located remotely from data processing system 202. For example, the resource management process 204 and the upgrade management process 306 may be running on a computing system located remotely from data processing system 202. The resource management process 204 and the upgrade management process 306 may communicate with data processing to monitor and control the use of power in data processing system 202.

In other illustrative embodiments, the set of resources 206 may include any number of boards. Each board in set of resources 206 may have a separate controller, such as controller 324 for example. Controller 324 may also control processors on more than one board in set of resources 206. In some illustrative embodiments, sensors such as core performance sensor 336 may be located on each board in set of resources. In other examples, set of resources 206 may include sensors for each resource. Sensors in core performance sensor 336 may be part of individual processors in processor 316 as well as cores in the multiple cores 326.

Figure 6:
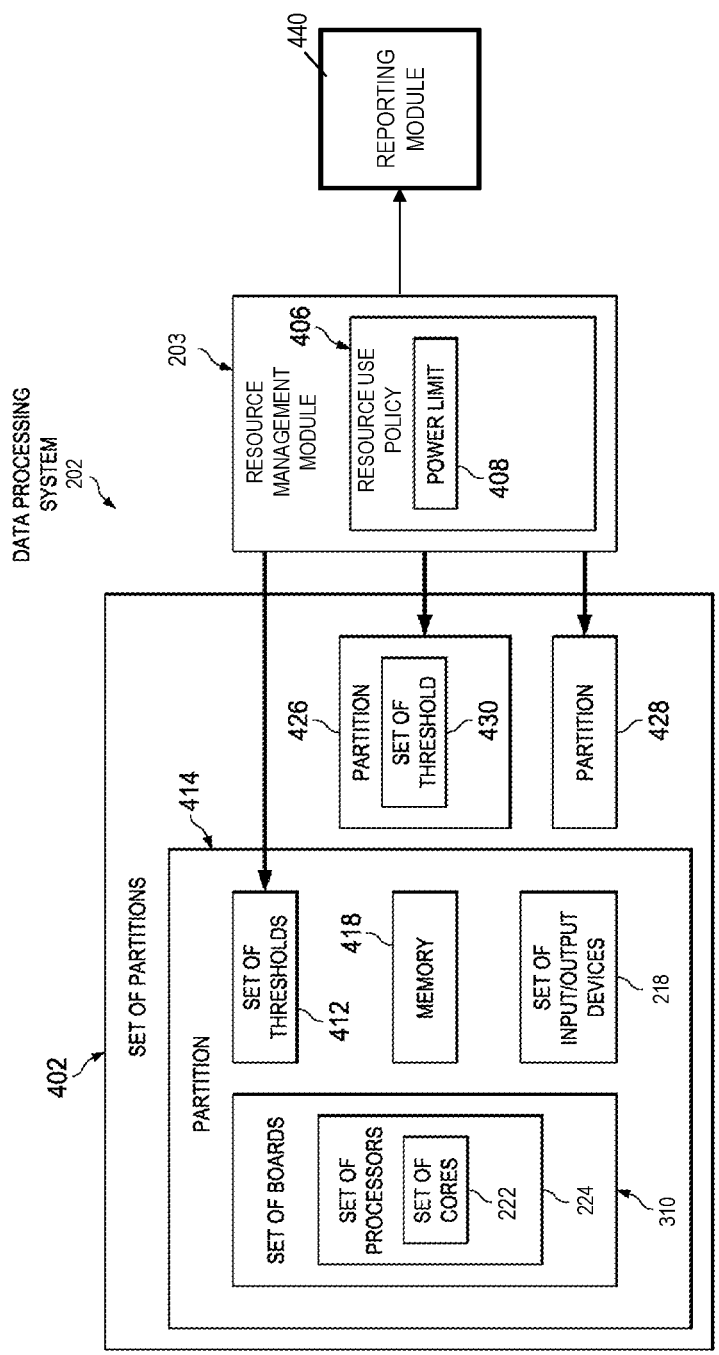
FIG. 6 depicts a block diagram of a set of partitions a data processing system is depicted in accordance with an illustrative embodiment.

With reference now to FIG. 6, an illustration of a block diagram of a set of partitions a data processing system is depicted in accordance with an illustrative embodiment. The data processing system 202 includes a set of partitions 402.

In the illustrated example, the resource management module 203 includes a resource use policy 406 for a set of partitions 402 in the data processing system 202. The resource use policy 406 is a policy that specifies the use of computing resources in the data processing system 202. For example, the resource use policy 406 may include resource limit(s) 408. The resource limit 408 may be a limitation on an amount of computing resource that is available for use in the data processing system 202. The resource limit 408 may also be a limitation on the amount of power that can be "consumed" or "used" by a partition from the set of partitions 402. In one or more examples, the resource limit 408 is based on an SLA associated with the partition, the SLA being setup with a user that is using the partition.

In these illustrative examples, the resource use policy 406 may include set of thresholds 412 for partition 414. Set of thresholds 412 may include resource use thresholds for devices in partition 414. For example, set of thresholds 412 may include resource use thresholds for each board from the set of boards 310, memory 216, and set of input/output devices 218. Thus, power use thresholds in the set of thresholds 412 may be specific to devices in partition 414. Similarly, each processor in the set of processors 224 and each core in set of cores 424 may have thresholds in set of thresholds 412 for the use of power.

The resource management module 203 may monitor computing resource use by devices in partition 414. The resource management module 203 may determine whether the use of the computing resources by the devices in partition 414 is within thresholds in set of thresholds 412. If the use of computing resources is not within the thresholds, the resource management module 203 may determine that the use of the computing resources does not meet resource use policy 406.

The resource management module 203 also monitors computing resource use in partitions 426 and 428. For example, resource use policy 406 may include set of thresholds 430 for the use of computing resources by devices in partition 426. Set of thresholds 430 may limit the use of computing resources in partition 426. For example, the resource management module 203 receives a request to increase a capacity in partition 426. The resource management module 203 may grant the request of the use of computing resources resulting from granting the request is within set of thresholds 430 and meets resource use policy 406. Set of thresholds 430 for partition 426 may ensure that increases in the use of computing resources by devices in partition 426 do not exceed the contractual values per the SLA. Thus, the resource management module 203 may not grant requests to increase capacity in one partition when the request causes capacity to exceed the SLA values.

The resource management module 203 can allocate resources 206 from another data processing system 202 in the resource management environment 200. For instance, in case one of the processors 224 of a first data processing system is being used for an internal event of the first data processing system 202, such as a diagnostic event, an initial program load, capturing a trace, or any other such computationally intensive operation, the resource management module 203 can allocate one of the processors 224 from a second data processing system 202 to handle one or more operations/workload in the first data processing system 202. In a similar manner, any other type of resources 206 of the second data processing system 202 can be allocated to perform a task/operation of the first data processing system 202 if any of the computing resources 206 of the first data processing system 202 are being used for an abnormal event.

In one or more examples, a reporting module 440 receives a computing resource usage by each of the partitions in the set of partitions 402. The reporting module 440 generates, automatically, a bill for the one or more respective users (client devices) according to the computing resources used by the corresponding partitions. For example, the reporting module 440 receives a duration for which a particular computing resource has been used by the partition 414. The reporting module 440 uses the SLA for the user who is using the partition 414 to determine rates for one or more of the computing resources used by the partition 414 and calculates the bill amount for the user according to the SLA.

The illustration of a set of partitions 402 in data processing system 202 is not meant to imply physical or architectural limitations to the manner in which different features may be implemented. Other components in addition to and/or in place of the ones illustrated may be used.

In case of an abnormal event, such as a hardware failure, or a software failure, the one or more computing resources have to be used to resolve the failure condition. Such use of the computing resources may not be billed to the user, because resolving the failure condition can be considered an internal event for the data processing system 202.

Further, the failure condition can cause the user to have an outage of service provided by the user. For example, the user may be a cloud service provider such as social network providers (e.g. FACEBOOK™), e-commerce providers (e.g. AMAZON™), financial institutions (e.g. banks), health service providers (e.g. insurance providers) and the like, where even the smallest of outages can have major consequences. As described herein, in one or more examples, the cloud outages are the result of failures in the infrastructure of the data processing system 202. Alternatively, or in addition, failures are caused by a workload provided by the cloud service provider, or an end-user of the cloud service provider. Regardless of the source of the outage, it is imperative to get the systems executing on the data processing system 202 operating in normal running conditions as fast as possible.

Typically, diagnosing the failure condition requires resource intensive diagnostics. For example, additional processor(s) is consumed when failure diagnosis requires the creation of detailed trace records and additional data logging. Some hardware feature, such as branch trace one or more processors can have a significant processor overhead. Further, debugging of stack overlays on processors, such as x86 architecture, can require additional processor to check pointers and control stack placement. In one or more examples, outages or abnormal events causing the failure condition that require computing resource intense traces or diagnostics can occur in the partition 414 while other partitions continue normal processing, without failure conditions.

In one or more examples, to handle such outages, clustered computing is a common technique to provide high availability (HA) processing. In a HA system, multiple machines are setup, each capable of running the workloads. In one or more examples, the workload can be split and executed concurrently on multiple machines in the cluster. When one machine in the cluster experiences an outage, or failure condition, additional processors from a second machine in the cluster may provide support for diagnosis of the outage. Alternatively, or in addition, the second machine in the cluster can absorb additional workload that was being operated by the first machine with the failure. In such cases, the additional load on the fallback system, second machine in this case, is higher than the steady state load as the second machine. Further yet, the second machine may have to perform extra operations to complete any backlog workloads that accrued while the primary system, the first machine with failure, was out. This fallback operation can be planned or unplanned.

Thus, resolving the failure condition can be computing resource intensive. For example, resolving the failure condition can include performing a trace operation to capture a system dump and diagnosing the data processing system 202 using the data in the captured system dump. Further, the resolution can include restarting the operating system in the partition 414, which can include an initial program load (booting). The initial program load can be a computationally intensive process. Such uses of the computing resources can affect the SLA with the user because the user does not receive a level of performance that may be contracted in the SLA.

Additionally or alternatively, in one or more examples, moving workloads from one data processing system to another data processing system are mandatory. For example, US Government has regulations that require banking industry, and other sensitive industries to perform periodic movement of processing between two or more data processing systems to demonstrate compliance. Such movement of workloads causes the data processing systems to perform initial program loads.

Such failure condition resolutions and initial program loads cause a technical problem of slowing the operation of the data processing systems. Further, the technical problems include using computing resources for operations other than a workload from user; rather, the computing resources are used for internal data processing operations that are invisible to the user.

The one or more embodiments of the present invention address such technical problems by detecting an abnormal event that takes away processing capacity from a processor or from one or more processors in a cluster provide additional CPU or other resources. According to one or more embodiments of the present invention, when a data processing system detects an IPL/Boot in one hypervisor (or partition), the data processing system works with one or more hypervisors to increase the processing capacity of the processors used by the booting system or partition. The duration of the capacity increase can be wall clock time, or it could be until some event.

The improved performance can be targeted to support boot/IPL/recovery of a partition (a.k.a. virtual machine) while maintaining steady performance for other partitions (virtual machines) that are not currently going through boot/IPL/recovery. One or more embodiments of the present invention can be applied to bare metal machines and to various levels of hypervisors including level 1 and level 2 hypervisors.

The increased performance can be used in at least two ways in the data processing system 202. First, the increase in the computing resources shortens the boot/IPL/recovery process. Second, the increase in the computing resources provides additional processing capacity following completion of the boot/IPL/recovery process that can be used to complete workload backlog. The increased computing resources facilitate an increased performance capacity of the data processing system 202 that can be used to make completing the workload backlog faster once boot completes.

In one or more examples, the increased performance obtained by allocating computing resources from a second data processing system 202 facilitates bringing the first data processing system 202 to full capacity while one or more members of the server cluster (i.e. resource management environment 200) have additional processing costs due to the abnormal event(s). In one or more examples, the second data processing system 202 grants additional computing resources to the first data processing system 202 (or any other data processing system), where both data processing systems are part of the same server cluster. Alternatively, or in addition, in one or more examples the second data processing system 202 provides additional computing resources to offset the processing costs of a data processing system 202 that is part of a second server cluster (resource management environment 200). In one or more examples, using the computing resources 206 from a second server cluster can offset processing costs that are expended to complete abnormal events, and resolving the abnormal events, for example, diagnostic events such as traces.

The processors 224 provide different cost/performance trade-offs. For example, processors, such as IBM z14™, offer 26 distinct capacity levels; thus, a data processing system with six sets of processors can offer a total of 156 capacity settings (26×6). In one or more examples, the processors 224 may operate at an artificially reduced capacity level during steady state operation of the partitions 402. The capacity level can be increased by instructing the processors 224 to use additional computing resources, changing the frequency at which they processors 224 operate, and the like. It should be noted that the processors 224 can be any other processor type than the above example, such as ARM™ processors, X86-architecture-based processors, and others.

Figure 7:
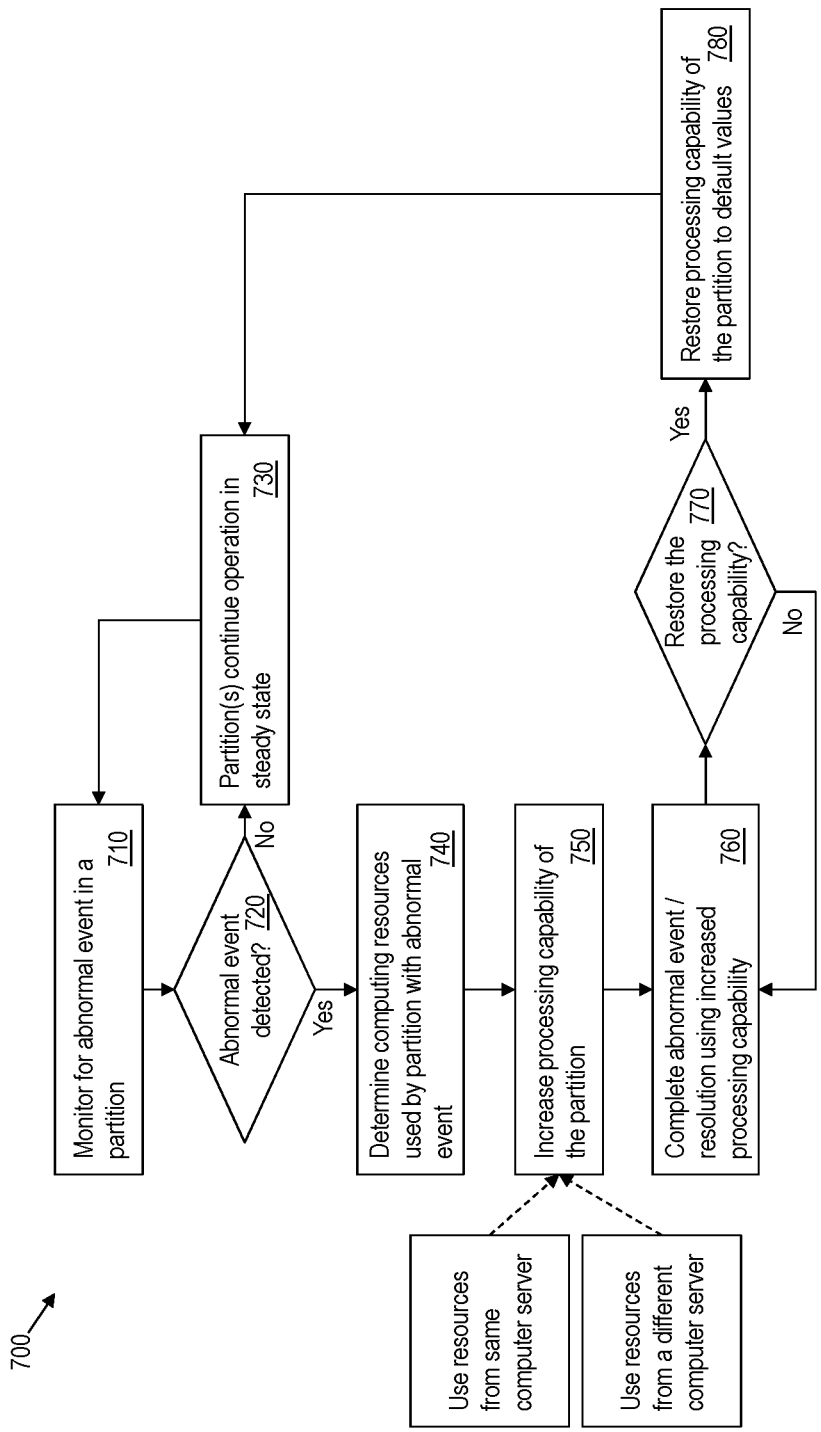
FIG. 7 depicts a flowchart of an example method of increasing processing capacity of processor cores during specific event processing according to one or more embodiments of the present invention.

FIG. 7 depicts a flowchart of an example method 700 of increasing processing capacity of processor cores during specific event processing according to one or more embodiments of the present invention. The method 700 includes monitoring for an abnormal event at a partition 414 from the set of partitions 402 in the data processing system 202, at 710. In one or more examples, the hypervisor 330 or the partition manager 334 can monitor the performance of the partitions for the abnormal event. The abnormal event can be any one of the events of hardware failures, software failures, collecting diagnostic information, and application of hardware and/or software service patch, planned shutdown of a running system, and the like. The abnormal event in the partition 414 can be detected by monitoring an output level of the partition 414, where the abnormal event is a condition that adversely affects the ability of the partition 414 to deliver expected levels of output. The abnormal event can further include an initial program load (IPL) of an operating system of the partition 414. In one or more examples, the operating system is in a cloud or hyperscale environment.

Until an abnormal event is detected (720), the partition 414 continues to operate using the allotted computing resources 206, at 730. The allotted computing resources 206 are based on the SLA with the user/client using the partition 414. This is referred to as a 'steady state' of the partition 414, when the partition is operating using the default computing resource settings according to the SLA.

If an abnormal event is detected (720), the computing resources 206 being used by the partition 414 are identified, at 740. Further, the resource management module 203 increases the processing capacity of the partition 414 by increasing the computing resources 206 allotted to the partition 414, at 750. The additional computing resources that are provided can be from the second data processing system 202. Alternatively, or in addition, the additional computing resources that are provided.

For example, additional resource added includes additional processing capacity which can be delivered via increasing the number of cores 222 allocated for the partition 414. Alternatively, or in addition, the processing capacity can be increased by increasing the processing capacity per core 222. For example, the operation of the processors 224 is adjusted using On/Off Capacity on Demand (CoD) to enable and disable hardware engines of the processors 224. Alternatively, or in addition, the processing capacity can be increased by changing virtual machine priority on a virtualized system.

In one or more examples, the additional processing capacity of the partition 414 can be provided by increasing IO devices 218, increasing memory 216, or other such computing resources 206 allocated to the partition 414.

Alternatively, or in addition, the additional capacity is delivered by moving the operating system image of the partition 414 using live guest relocation techniques to another data processing system 202 that can deliver additional capacity with the intent of partially or fully offsetting the performance impact of the abnormal event. In this case, the other data processing system 202 to which the partition 414 is moved can be referred to as a backup data processing system 202. In one or more examples, the resource management module 203 of the backup data processing system 202 allocates one or more computing resources 206 to the relocated partition 414 from a third data processing system 202. As described herein, the computing resources allocated to the partition 414 can be further configured dynamically, such as using capacity on demand or other techniques.

The additional processing capacity is provided by the resource management module 203. In one or more examples, the partition 414 indicates the type of abnormal event and in response the processing capacity is increased by providing the one or more additional computing resources 206 as described herein.

Once the additional processing capacity is provided, the partition 414 completes abnormal event/resolution of the abnormal event using the increased processing capacity, at 760. Resolving the abnormal event can include operations that are performed after completion of the abnormal event. For example, in case the abnormal event is an IPL, the additional computing resources 206 facilitate the partition 414 to complete the IPL in a shortened amount of time as compared to an IPL with the steady state computing resources.

Further, in one or more examples, the additional computing resources are used by the partition for resolving the abnormal event. Resolving the abnormal event can include performing one or more follow up operations, such as to determine a cause of the abnormal event. For example, in case the abnormal event is an IPL caused by an unplanned system shutdown, the resolution can include performing a system diagnostic, trace, and other types of analysis to determine the cause of the abnormal event. Because such operations for resolving the abnormal event can also be computationally intensive, the resource management module 203 can facilitate the additional computing resources to complete such operations.

In one or more examples, the resource management module 203 checks if the operations are completed to determine when to restore the computing resources allotted to the partition 414 according to the steady state, as per the SLA, at 770. Alternatively, or in addition, the resource management module 203 checks a time duration since the additional, or increased computing resources are allotted to the partition 414, and restores the computing resources to the steady state after a predetermined duration. In neither condition is met, the partition 414 continues to complete the operations for the abnormal event and/or resolving the abnormal event using the additional resources, at 760.

If at least one, or both conditions are met, the resource management module 203 restores the computing resources of the partition 414 to the steady state according to the SLA, at 780. The partition 414 further continues to operate according to the steady-state resources, at 730. The method 700 continues to operate continuously. Restoring the computing resources of the partition 414 includes deallocating the additional computing resources that were allocated to the partition 414. It is understood that although the partition 414 was used as an exemplary partition to describe the method 700, in other examples a different partition from the set of partitions 402 can experience the abnormal event.

The one or more embodiments of the present invention accordingly provide a system where an abnormal event is detected and additional resources are provided based on detection of the event. The abnormal event is a condition that affects the ability of data processing system, particularly a partition of the data processing system, to deliver expected levels of output, as per an SLA or other thresholds. The duration of the application of additional resources extends past the duration of the event. For example, additional resource applied during an IPL (boot) that continues to be available for some period of time after the abnormal event, such as an IPL (boot).

According to one or more embodiments of the present invention, a data processing system, such as a computer server, can detect an abnormal event in a partition, and in response, provide additional computing resources to that partition. The abnormal event is a condition that affects the ability of data processing system to deliver expected levels of output, such as processing capacity. The desired level of output can include one or more thresholds, for example provided in an SLA. Examples of abnormal events include hardware failures, software failures, collecting diagnostic information, application of hardware and software service updates/patches, and planned shutdown of a running system.

In one or more examples, the abnormal event that is detected is the IPL (boot) of an operating system on either physical or virtual hardware. In one or more examples, the IPL (boot) of an operating system is in a cloud or hyperscale environment.

In one or more examples, the additional resource added is additional processing capacity which could be delivered via additional cores, by increasing the processing capacity per core (for example increase in capacity from a subcapacity model to a full speed model), and/or by changing virtual machine priority on a virtualized system. The additional capacity added can include IO devices, memory, or other hardware electronic circuitry being allocated for the partition 414 to use. In one or more examples, the additional capacity added is delivered by moving the operating system image of the affected partition to an environment that can deliver additional capacity with the intent of partially or fully offsetting the performance impact of an abnormal event.

The one or more embodiments of the present invention accordingly provide an improvement to computer technology. For example, a cloud computing provider can use one or more embodiments of the present invention to increase actual processing performance as seen by a virtual machine in a partition in a virtualized environment through tuning of hypervisor priorities. The virtual machine can handle various workloads and request additional computing resources that can be allocated not only from the computer server that hosts the virtual machine, but also from another computer server that may be part of a server cluster of the computer server. Further, in one or more examples, particularly for data processing systems with multiple partitions, computing resources from a second partition can be allocated to the partition that is demanding higher computing resources. As described herein, the computing resources are allocated in response to detection of planned and/or unplanned event, such as boot/IPL/recovery time etc., which can be a major source of downtime for computer users. The one or more embodiments of the present invention herein shorten such downtime because of boot/IPL/recovery time, or other events, thus improving the performance of the data processing system.

In other examples, a database server such as ORACLE EXADATA™ can use the one or more embodiments of the present invention to have workload continue processing without impact while running traces inside the database appliance. The database server can also provide additional processing capacity following a server outage to help a client recover from a workload outage by allocating additional computing resources to resolve the workload outage.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    allocating, for a partition from a plurality of partitions of a computer server, a first set of computing resources of the computer server;
    receiving a request to increase processing capacity for the partition, wherein the request is in response to a predetermined event in the partition, the predetermined event comprising an initial program load of an operating system instance executing in the partition;
    in response, allocating a second set of computer resources, in addition to the first set of computer resources, for the partition; and
    operating the partition using the first set of computing resources and the second set of computing resources.

2. The computer-implemented method of claim 1, wherein the second set of computing resources is from the computer server that is hosting the partition.

3. The computer-implemented method of claim 1, wherein the second set of computing resources is from a second computer server, the partition being hosted by a first computer server.

4. The computer-implemented method of claim 1, further comprising:
    deallocating the second set of computing resources from the partition in response to completion of the predetermined event.

5. The computer-implemented method of claim 1, further comprising:
    deallocating the second set of computing resources from the partition after a predetermined duration since allocating the second set of computing resources.

6. A system comprising:
    a plurality of computer servers, each computer server comprising:
        a plurality of computing resources;
        a plurality of partitions;
        a memory device; and
        one or more processors coupled with the plurality of partitions and the plurality of computing resources, the one or more processors configured to adjust processing capacity of a partition of a computer server from the plurality of computer servers, the partition being one of the plurality of partitions, by performing a method comprising:
            allocating, for the partition, a first set of computing resources from the plurality of computing resources;
            receiving a request to increase processing capacity for the partition, wherein the request is in response to a predetermined event in the partition, the predetermined event is an initial program load of an operating system instance executing in the partition;
            in response, allocating a second set of computer resources, in addition to the first set of computer resources, for the partition; and
            operating the partition using the first set of computing resources and the second set of computing resources.

7. The system of claim 6, wherein the second set of computing resources is from the computer server that is hosting the partition.

8. The system of claim 6, wherein the second set of computing resources is from a second computer server, the partition being hosted by a first computer server.

9. The system of claim 6, wherein the method further comprises deallocating the second set of computing resources from the partition in response to completion of the predetermined event.

10. The system of claim 6, wherein the method further comprises deallocating the second set of computing resources from the partition after a predetermined duration since allocating the second set of computing resources.

11. A computer program product comprising a computer-readable storage medium having stored thereon program instructions executable by one or more processing devices to perform a method comprising:
    allocating, for a partition from a plurality of partitions of a computer server, a first set of computing resources of the computer server;
    receiving a request to increase processing capacity for the partition, wherein the request is in response to a predetermined event in the partition, the predetermined event is an initial program load of an operating system instance executing in the partition;
    in response, allocating a second set of computer resources, in addition to the first set of computer resources, for the partition; and
    operating the partition using the first set of computing resources and the second set of computing resources.

12. The computer program product of claim 11, wherein the second set of computing resources is from the computer server that is hosting the partition.

13. The computer program product of claim 11, wherein the second set of computing resources is from a second computer server, the partition being hosted by a first computer server.

14. The computer program product of claim 11, wherein the method further comprises deallocating the second set of computing resources from the partition in response to completion of the predetermined event.

15. The computer program product of claim 11, wherein the method further comprises, deallocating the second set of computing resources from the partition after a predetermined duration since allocating the second set of computing resources.

* * * * *